3,379,658
POROUS FILM AND METHOD OF MAKING
Charles R. Kemper, 500 Canterbury Drive,
Dayton, Ohio 45429
No Drawing. Continuation-in-part of application Ser. No. 218,531, Aug. 22, 1962. This application May 25, 1964, Ser. No. 370,042
15 Claims. (Cl. 260—2.5)

ABSTRACT OF THE DISCLOSURE

Breathable polyvinyl chloride cellular sheets are formed from a plastisol mixture with polyvinyl chloride and a plasticizer, having dispersed therethrough particulate sodium tetraborate decahydrate (borax) capable of passing through a 100 U.S. Standard mesh screen, and a water soluble cell forming material such as sodium chloride. The plastisol mixture is formed into sheets and thereafter heated for release of water of hydration from the borax which forms small channels through the sheet as the latter is being cured. These channels permit access of a leaching medium to the anhydrous borax and water soluble cell forming material.

---

This invention relates to plastic film or sheets and the like, and more particularly it relates to a method of obtaining a flexible vapor permeable sheet of polyvinyl chloride, and to the product of such method. This invention relates more particularly to a polyvinyl chloride material formed by heating a plastisol to an elevated temperature of about 300° F. to 400° F. The plasticizer such as Union Carbide & Chemicals Company Flexol 380 may be used with powdered resin such as Exon 654 of Firestone Tire & Rubber Company in about equal proportions by weight or with the resin up to about twice the weight of the plasticizer.

Many attempts have been made to obtain a flexible porous polyvinyl chloride sheet with interconnected tiny pores of fairly uniform size. Crystalline sodium chloride has been tried with polyvinyl chloride compounds and the salt crystals later dissolved out to the extent the solvent could find access to the crystals. However such attempts have not been satisfactory. It is believed that due to the tenacity of the covering of highly plasticized vinyl chloride resin surrounding the individual salt crystals a moisture resistant barrier is present to block out the water in the leaching process in these past attempts. Such objections or defects however, appear to be overcome by using borax in accordance with the present invention.

It is therefore one of the objects of the invention to provide a novel plastic film or flexible sheet of porous polyvinyl chloride, with open cells of such character as to give vapor permeability or the ability to breathe.

Another object of the invention is the provision of a novel method of making a porous plastic sheet of this character, where the pores are provided to a substantial degree by crystalline borax.

A further object of the invention is the method of making a flexible sheet of polyvinyl chloride having significant tensile strength and elasticity, in which water soluble salt crystals present in the mixture treated are trapped or encapsulated in the plastisol during the gelling stage and before the thermo-setting or fusing temperature is obtained, and then during the heating process water of crystallization from some of the salt crystals is released and vaporized to provide open pores and form tiny intercommunicating channels between the various salt containing chambers.

A further object resides in the method of making a sheet of this character from a plastisol containing about 2 to 20% borax crystals.

Another object of the invention resides in the provision of a novel polyvinyl chloride sheet or film having vapor permeability and the method of making the same, possessing the advantageous features and the means and modes of procedure hereinafter described.

With the above and other incidental objects in view as will be more fully apparent from the specification, the invention intended to be protected by Letters Patent consists of the features and arrangements and combinations as hereinafter described, or their equivalent, the present application being a continuation-in-part of my application Ser. No. 218,531 filed Aug. 22, 1962, now abandoned.

The type of material with which this application is concerned is a polyvinyl chloride compound. The resin may be in the form of a fine powder thoroughly mixed in a plasticizer to form a liquid suspension or plastisol mixture or dispersion. The plasticizer ordinarily employed with resins of this type of material usually results in a mixture with a gelling point at a temperature of about 170° F. although this temperature is not clearly defined and may have somewhat of a range especially in view of the different kinds of plasticizing agents that may be employed.

Ordinarily, too, this type of resinous material would be cured or fused at a temperature of about 350° F.

Attempts have been made to provide open cells of chambers of air or gas in polyvinyl chloride compounds by means of chemical blowing agents but the past processes do not provide a satisfactory surface and are very critical because once the gas chambers are formed by the generated gases there is an immediate tendency for the chambers to collapse or to combine to form large bubbles if the chambers are in communication with each other.

In accordance with the present invention the plastisol has added to it a quantity of water soluble salts in the form of finely divided powder. The amount of salts added is about 25% to 200% by weight of the weight of the plastisol, the latter providing a rather thick but viscous mixture. The resin may be a homopolymer or a copolymer of vinyl chloride, the term polyvinyl chloride here including copolymers of vinyl chloride with other vinyl resins. Exon 654 of Firestone Tire & Rubber Company has been found to be very satisfactory for this purpose. The plasticizer employed may be one suitable for use with this type of resin. Union Carbide and Chemicals' Flexol 380 has been found to be very satisfactory. The proportion of resin powder to plasticizing agent should be from about 10 to 10 to about 10 to 8 or less, these proportions varying greatly in dependence on the equipment available and the particular characteristics and sheet thickness desired.

The particular salt crystals employed are pore forming crystals is very important. Sodium chloride crystals alone are ineffective because if they are thoroughly mixed they will also be thoroughly encased in resinous films during the curing stage and water cannot get access to them later to dissolve the salt away. Glauber's salt has been tried with certain cellulose materials since it contains some water of crystallization which it gives up however at a point far far below that temperature at which a vinyl resin compound would gel and since the liberated water has a degrading effect on the plasticizer and resins of a polyvinyl chloride character, the use of Glauber's salt is not suitable. It has been found however that by using an adequate amount of crystalline sodium tetraborate, or borax containing water of crystallization as a pore forming agent, tiny increments of water are liberated from the borax during the gelling stage and prior to the fusing or setting temperature. This water liberation does not start until after the heating or curing stage has been started.

Sodium tetraborate decahydrate ($Na_2B_4O_7 \cdot 10H_2O$) is the preferred salt. The water of crystallization is given up at a temperature well in excess of 140° F. and well below the fusing temperature of the vinyl resin and vaporized at about the boiling point of water and well below the fusing or setting temperature of the polyvinyl chloride and is supplied in the form of exceedingly tiny increments from the tiny dispersed particles of borax well distributed throughout the plastisol. The steam generated forms tiny channels of communication between the chambers containing the borax crystals and tiny channels to the outer surfaces of the material. The time in which the water of crystallization can act on the plastisol is very limited, only a matter of a minute or so, so the water does not have the degrading effect that would be produced if any substantial amount of water were present for any substantial time period.

The crystalline sodium tetraborate in accordance with the present invention is employed with other water soluble salts, preferably crystalline sodium chloride used with the borax in quantities for exceeding the borax present. It has been found the steam generated by the distributed borax crystals forms passages between the chambers containing the borax and the chambers containing the sodium chloride so that after curing or fusing of the resin the leaching water can have access to the sodium chloride crystals to dissolve them as well as the remaining sodium tetraborate. By using substantially more sodium chloride than borax there is not only an economy in the material cost but in addition the sodium chloride acts as a stabilizer in that it assimilates some of the water of crystallization of the borax and prevents an undue large excess of such water as might affect the strength of the sheet. It has also been found that by adding a percent or two of sodium bicarbonate the outer surface of the finished product is somewhat improved.

The crystals of borax after heating will remain as anhydrous sodium tetraborate following the release of the water of crystallization, and the sodium chloride crystals will remain in the product until the fusing or setting stage has been completed. The entire time for the heating process is only about 2 or 3 minutes for thin sheets and 5 to 7 minutes for sheets that might be about 1/4" thick. The temperature used is about 350° F. although temperatures as high as 400° or as low as 300° are practical. After the heating phase the sheet is carried through a water bath where the salts are leached out. The water bath is preferably provided with a series of pressure rollers between which the sheet passes to aid in the leaching process.

The relative amount of crystalline borax employed in the plastisol will vary depending upon the type of material desired but to give an air permeable product the amount of borax should be from 2 to 20% of the complete mixture from which the sheet is made. The amount of sodium chloride crystals should be about 4 to 20 times the weight of borax used.

The following specific examples are intended as illustrations of my invention and not as limitations thereof. For example the following combinations were prepared by mixing the ingredients as follows:

Flexol 380. The borax was in the form of fine powder most of which could pass through a 100 U.S. standard screen. The sodium chloride crystals were also small enough so that most of them could pass through a 100 U.S. standard screen. The polyvinyl chloride powder was thoroughly mixed in the plasticizer before adding the mixed crystalline salts. The salt and borax were very thoroughly mixed with one another and with the sodium bicarbonate, where employed, before adding to the plastisol. Roller or crush milling of the entire compound during the mixing operation, to insure a more complete dispersion of the crystalline materials, seems to produce a better finished product. Entrained air bubbles are preferably removed by vacuum before pouring the mixture at normal temperature on a traveling carrier. This carrier may be a carrying belt of metal or other suitable material from which the heated sheet is later released. The sheet is then passed on the carrier through the heating zone where it is subjected to heat of about 300° F. to 400° F. for a few minutes depending upon the thickness of the sheet. During the heating process as previously explained the water of crystallization in the active salt, borax, is driven off and then vaporized after the gelling phase to create a series of interconnecting cells in the final product. These cells range in size from a few microns to a few thousandths of an inch. These tiny pores are so numerous that the apparent density of the product is from about 50% to 80%. The collapse of these cells produced during the heating stage is prevented because of the salt crystals themselves. The hot water then leaches the soluble residues from the product after the curing stage is completed. The tiny interconnecting channels between the cells extend from the surface to surface in an incoherent manner and permits this leaching process to an effective degree so that substantially all the water soluble salt is quickly removed.

For some purposes the porous sheet may be made entirely from the plastisol but in many cases and to provide adequate strength an open weave sheet of fabric of cotton, nylon, rayon or other suitable flexible material may be incorporated in the product. This fabric sheet may be applied to the traveling belt or carrier and the resinous mixture spread upon it or it may be added at the top of the resinous layer. It may be of advantage to finish the material as an unsupported film and then cement to the desired substrate. Where the material of the fabric is one that is effected by high heat the curing temperature used may be about 300° F.

Where the requirements are such as to require a greater proportion of water soluble salts with respect to plastisol it has been found to be advantageous to add a small amount of solvent or mineral spirits to thin the mixture before the sheet is cast and to aid in obtaining a thorough mixture. The amount of solvent or mineral spirits may be of the order of 1% by weight.

In the examples the sheets were soft to the touch and air permeable with pores throughout and in communication with both outer surfaces. The lower sides which rested on the carrier were smooth. The upper surfaces were rougher and somewhat tougher. When examined under a microscope the tiny pore openings were quite apparent

| Example | Parts by Weight in Percent | | | | | | | | |
|---|---|---|---|---|---|---|---|---|---|
|  | 1 | 2 | 3 | 4 | 5 | 6 | 7 | 8 | 9 |
| Polyvinyl Chloride Resin | 16 | 19 | 25 | 22 | 28 | 28 | 31 | 42 | 38 |
| Plasticizer | 16 | 21 | 24 | 22 | 25 | 26 | 30 | 35 | 31 |
| Nacl | 60 | 56 | 47½ | 44 | 42 | 35 | 29 | 10 | 10 |
| Borax | 7 | 4 | 2½ | 11 | 5 | 11 | 9 | 10 | 18 |
| Sodium Bicarbonate | 1 |  | 1 | 1 |  |  | 1 | 3 | 3 |

In addition small quantities of conventional stabilizer and coloring additives were present. In Examples 2 to 9 the resin was Exon 654 and the plasticizer was Flexol 380. In Example 1 the resin was a mixture of Exon 654 and Monstanto's 440, and the plasticizer was a mixture of known plasticizing agents including the aforementioned with no surface roughing treatment. Example 1 was softest to the touch and had the lowest apparent density, about 1/3. The density generally increased as the salt content employed descreased. The samples having the least capability of vapor transmission were the ones resulting from the smaller content of water soluble salts. The sample resulting from the use of a minimum of sodium chloride were of higher apparent density.

It has been found that the salt crystals can be mixed in the plastisol for a long time prior to the time of use. It is not necessary to mix the ingredients and use them immediately as it is in the case of some blowing agents and organasols. The resulting product is stable and the temperatures of treatment and proportions are not exceedingly critical so the process is capable of being very conveniently employed. Within a wide range of porosity the sheet may be of a desired apparent density merely by choosing the right water soluble salt content for the purpose desired. The resultant product is one that is strong, stable, odorless, flexible and is capable of breathing. It is not a water barrier since it is to some degree water permeable but only water permeable to a degree. Water would travel slowly through all of the examples referred to. This product may thus be used where a water repellant characteristics is desired but since it has the capability to breathe, since the pores provided form channels clear from one side of the sheet to the other, the material is particularly satisfactory for use in many places where this characteristic is an advantage, for example, in clothing, shoes, upholstery, carpeting, and many other uses.

While the invention has been discussed at length it should be understood that the invention is not limited to the specific features and proportions referred to, but that the method herein disclosed comprises but one of several modes of putting the invention into effect.

Having thus described my invention I claim:

1. The method of producing a flexible vapor permeable polyvinyl chloride sheet material with interconnecting pores comprising the steps of forming a plastisol mixture comprising polyvinyl chloride resin, a plasticizer and a particulate water soluble crystalline material uniformly dispersed in said plastisol, said water soluble crystalline material comprising sodium tetraborate and a particulate water soluble material different from said sodium tetraborate, said sodium tetraborate containing water of hydration releasable at a predetermined temperature, forming said plastisol mixture into sheet material, advancing said sheet material into a heating zone having a temperature sufficiently high to release said water of hydration and to effect curing of said plastisol, maintaining said formed plastisol sheet material in said heating zone for a period of time sufficient to effect release of said water of hydration and to cure said plastisol, the release of said water of hydration providing tiny interconnecting channels randomly extending therefrom one surface to the other of said formed sheet material, and thereafter treating said cured sheet material with a leaching medium to dissolve the remaining soluble residues in said formed sheet material to provide a cured sheet having pores and interconnecting channels therein.

2. The method as set forth in claim 1 wherein said last treating step includes passing said cured sheet material through a series of pressure rolls.

3. The method as set forth in claim 1 wherein said sheet member is formed on a travelling carrier member.

4. The method as set forth in claim 1 wherein said plastisol mixture is formed by separately mixing said polyvinyl chloride resin and plasticizer, and said water soluble material and said sodium tetraborate, and adding said mixture of water soluble material and said sodium tetraborate to said mixture of polyvinyl chloride resin and plasticizer.

5. The method as set forth in claim 1 wherein said water soluble material different from sodium tetraborate is sodium chloride, and said particulate water soluble material being present in an amount by weight between 25% and 200% the weight of said plastisol.

6. The method as set forth in claim 1 wherein said formed sheet material is heated to a temperature of between 300° F. and 400° F.

7. The method as set forth in claim 1 wherein said sodium tetraborate is present in an amount by weight of between 2% and 20%, and said water soluble material different from said sodium tetraborate being sodium chloride present in an amount by weight of between 4 and 20 times the weight of said sodium tetraborate.

8. The method as set forth in claim 7 wherein said plastisol mixture contains between 1% and 3% by weight of sodium bicarbonate.

9. The method as set forth in claim 1 wherein said plastisol mixture contains an organic solvent.

10. The method as set forth in claim 1 further including the step of removing entrained air from said plastisol mixture prior to formation of said plastisol mixture into a sheet material.

11. The method as set forth in claim 1 further including the step of forming said plastisol sheet material on a fabric base prior to curing the polyvinyl chloride resin and plasticizer.

12. The method as set forth in claim 1 wherein said cured and leached porous sheet is adhered to a substrate.

13. The method as set forth in claim 1 wherein said formed plastisol sheet is heated for a period of between 2 to 7 minutes.

14. The method as set forth in claim 1 wherein said plastisol mixture is milled prior to formation of said plastisol sheet.

15. The method as set forth in claim 1 wherein said water soluble material different from sodium tetraborate is sodium chloride, said polyvinyl chloride resin being present between 16 and 42 parts by weight, said plasticizer being present between 16 to 35 parts by weight, said sodium chloride being present between 10 and 60 parts by weight, and said sodium tetraborate being present between 2½ to 18 parts by weight.

References Cited

UNITED STATES PATENTS

| 2,256,483 | 9/1941 | Johnston | 260—2.5 |
|---|---|---|---|
| 2,911,382 | 11/1959 | Barkhuff et al. | 260—2.5 |
| 2,984,869 | 5/1961 | Honey et al. | 260—2.5 |
| 3,055,966 | 9/1962 | Sundberg | 260—2.5 |

FOREIGN PATENTS 649,646  1/1951  Great Britain.

MURRAY TILLMAN, *Primary Examiner.*

M. FOELAK, *Assistant Examiner.*